United States Patent Office 3,045,702
Patented July 24, 1962

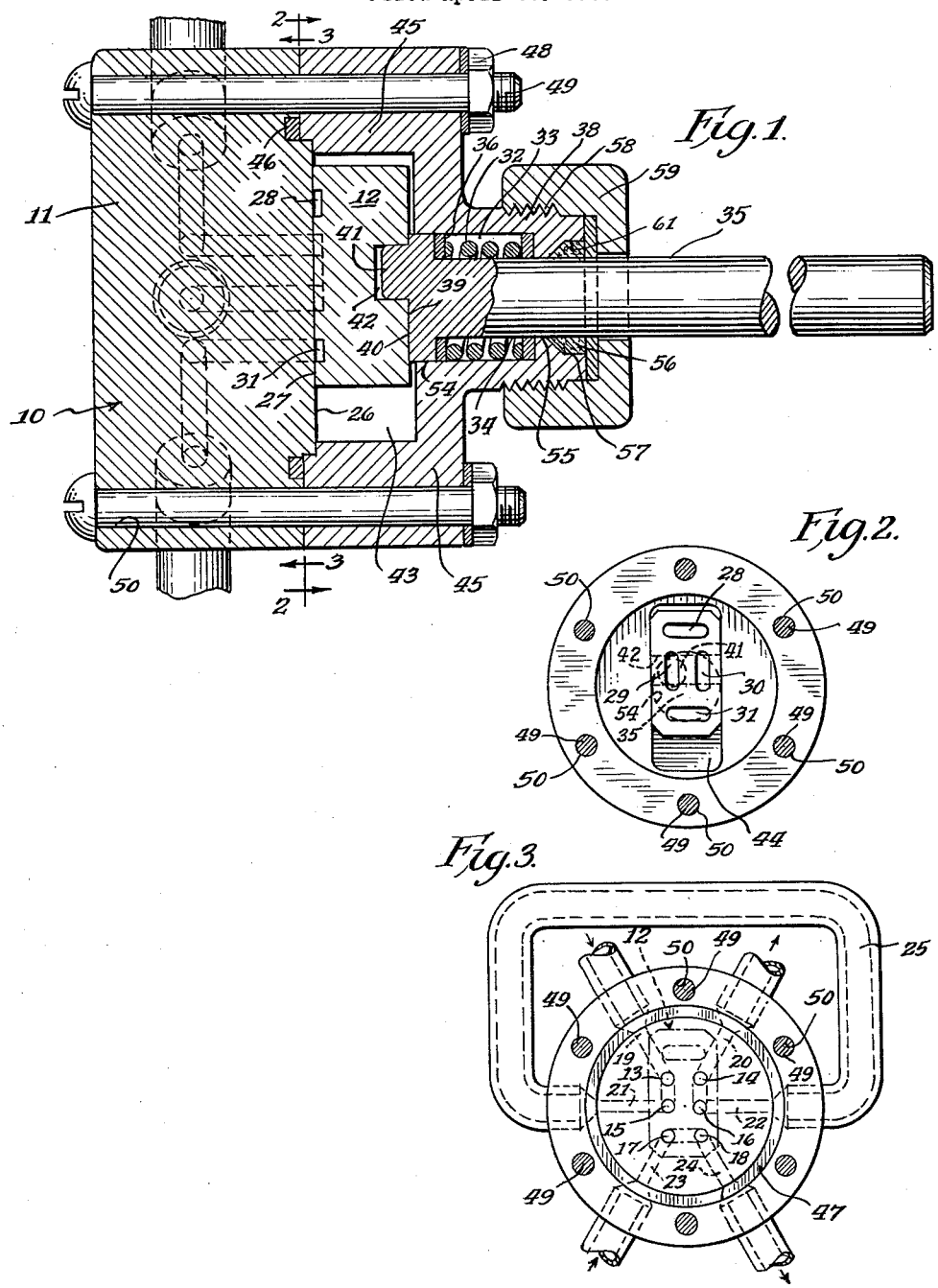

3,045,702
GAS SAMPLING VALVE
Arthur H. Nakata, Berkeley, Calif., assignor, by mesne assignments, to Cenco Instruments Corporation, Chicago, Ill., a corporation of Delaware
Filed Apr. 18, 1960, Ser. No. 22,738
1 Claim. (Cl. 137—625.48)

This invention relates to a fluid sampling apparatus for delivering an accurately reproducible volume of fluid from one fluid stream into another fluid stream.

The transfer of a predetermined reproducible volume of a given fluid into a stream of a second fluid is a procedure which has general application in gas analysis techniques. The operation has particular application in vapor phase chromatography.

The present invention is directed to an improved method of preventing leakage in a gas sampling apparatus and to an improved sampling apparatus or valve which facilitates the introduction of a measured volume of sample gas into a carrier gas stream as in vapor phase chromatographic analyses and in other analytical procedures in which similar techniques are employed.

Sampling valves for delivering a measured volume of gas from one stream to another are known in the prior art; and special sampling valves have been developed for use in vapor phase chromatography. An important problem experienced in using the valves of the prior art is the undesirable leakage which occurs at the working faces of the valve body. The improvement of the present invention relates to a novel method and a new valve structure by means of which uncontrolled leakage in the contact plane or planes of the fixed and movable portions of the valve is obviated.

Considerable research has been directed toward the solution of this problem which has long been recognized by workers in the field. Several methods have been employed to minimize leakage in valves of the type in which a piston or ram slides in a cylinder and also in valves of the type in which there is a flat working face between a body and a slide. In some cases the solution of the problem has been sought in super-finishing the contacting metal or glass surfaces to ensure intimate contact. In other instances the working surface has been covered with a plastic material, such as polytetrafluoroethylene, either in the form of a bushing or as a bonded surface. In order to maintain the requisite close contact of the working faces, external pressure has been applied, as for example by means of suitable spring arrangements.

In ordinary or less accurate procedures involving the manipulation and transfer of gas samples, it has been possible to use valve lubricants to reduce the likelihood of leakage. In more precise and exacting work the use of such lubricants is preferably avoided since the lubricants may constitute a source of contamination which might give rise to erroneous results.

In spite of the refinements in engineering and in spite of the use of special surfaces, some leakage occurs when the valves of the prior art are used in carrying out gas analysis by techniques such as vapor phase chromatography.

Thus, a principal object of the present invention is the prevention of uncontrolled leakage at the interface between the moving and stationary parts of the valve. A novel feature of the valve of this invention is a gas-tight housing which is sealed to the fixed portion or body of the valve and which encloses the movable portion or sliding block of the valve. The gas-tight housing forms a pressure equalization chamber wherein a counter pressure is developed which, under the conditions of operation, opposes the pressure of the gas in the valve itself and thus prevents leakage from the valve.

Other objects, uses, and advantages will be obvious or will become apparent from a consideration of the following detailed description and the application drawings.

In the drawings:
FIG. 1 is a longitudinal cross-sectional view of a valve illustrating one embodiment of the invention;
FIG. 2 is a transverse sectional view through the valve of FIG. 1 as taken along the line 2—2 of FIG. 1; and
FIG. 3 is a transverse sectional view through the valve of FIG. 1 as taken along the line 3—3 of FIG. 1.

A preferred form of the present invention is depicted in FIGS. 1, 2 and 3 and includes a valve, indicated generally at 10, having a fixed body 11 and a sliding or shiftable block 12. The valve body 11 is provided with ports 13, 14, 15, 16, 17 and 18 and associated flow channels 19, 20, 21, 22, 23 and 24, respectively. A sample chamber 25 is connected to ports 15 and 16 through channels 21 and 22; a sample source (not shown) is connected to ports 13 and 14 through channels 19 and 20; and a carrier gas supply (not shown) is connected to ports 17 and 18 through channels 23 and 24. The shiftable block 12 has a flat contact surface 26 for engagement with a cooperating contact surface 27 of the valve body and is provided with channels, recesses, or passages 28, 29, 30 and 31 arranged to cooperate with the ports and flow channels in the valve body.

In one position of the shiftable block (see FIG. 3), the valve provides a continuous path for the sample gas through channel 19, port 13, passage 29, port 15 and channel 21, and then through sample chamber 25. Completing the circuit through the sample chamber, the sample gas continues through port 16, passage 30, port 14, and finally out through channel 20. In the same selected position of the shiftable block, and simultaneous with the passage of the sample gas through the path indicated above, the carrier gas circulates through the valve, entering channel 23, continuing through port 17, passage 31, port 18 and finally out through channel 24.

In a second position (not shown) of the shiftable block, passage 28 connects ports 13 and 14, passage 29 connects ports 15 and 17, and passage 30 connects ports 16 and 18. By this arrangement the sample chamber 25 is connected in series with the carrier gas stream, delivering a predetermined and reproducible volume of sample gas into the carrier stream. The path of the carrier stream is through channel 23, port 17, passage 29, port 15 and out through channel 21 into sample chamber 25. The path is completed through channel 22, port 16, passage 30, port 18 and channel 24. In this same position of the shiftable block, sample gas may circulate directly through the valve following the path: channel 19, port 13, passage 28, port 14, and out through channel 20.

The contacting or working faces 26 and 27 of the valve body 11 and the shiftable block 12 are maintained in pressure contact with each other to ensure close cooperation between the surfaces and to minimize leakage at the interface or contact plane. In the valve of FIG. 1, this stressed contact is achieved by means of a helical compression spring 32 disposed in the sleeve tube 33 and coiled about the stem 34 of a rotatable block-positioning shaft 35. The compression spring 32 seats on an offset shoulder 36 of the shaft 35. As a result of the action of spring 32, the rotatable shaft 35 is urged inwardly and shoulder 39 of the shaft is maintained in stressed contact with the back 40 of the shiftable block.

An eccentric pin 41 on the end of the shaft 35 fits within a cooperating channel 42 in the shiftable block 12 such that, upon rotation of the shaft 35, the pin 41 engages the block 12 to displace the block within the chamber 43 in a plane perpendicular to the axis of rotation of the shaft 35 and along a guideway 44 in the valve body 11. Thus, rotation of the shaft 35 is translated into linear movement of the block 12, which is thereby positioned so that its passages connect the ports associated with the flow paths desired.

While the description above refers to a particular means of positioning the shiftable block within the valve, it is obvious that many other mechanical arrangements may be used for manipulating the movable parts of the valve. The composition of the contacting surfaces 26 and 27 may be the structural material of the valve, that is metal, glass, etc. If desired, however, a plastic such as polytetrafluoroethylene may be used as a surfacing material to minimize friction between the moving and stationary parts.

In accordance with the present invention, the valve structure is provided with a gas-tight housing in the form of a case or cover 45 enclosing the shiftable block 12 and connected to the fixed body 11 and to the shaft 35 to form gas-tight seals therewith. The shaft 35 projects through a sleeve portion 38 of the housing 45 so that one can position the shiftable block 12, located within the housing, by rotating the outer end of the shaft.

The seal between the housing and the body of the valve is effectuated by means of an O-ring 46 located in an annular groove 47 in the face of the body of the valve and in a plane parallel to the working face 26 of the valve body. The O-ring is preferably made of a silicone rubber but other suitable materals may be used. Nuts 48 and bolts 49 are assembled through sets of aligned holes 50 drilled through the valve body and the housing to secure these parts in gas-tight relation.

The rotatable shaft 35 passes through the sleeve 38 of the housing, and surfaces 54 and 55 of the sleeve cooperate with the shaft to act as bearings and guides. The gas-tight seal between the housing and the shaft of FIG. 1 is provided by an annular packing ring 56 located in an internal groove 57 at the outer end of the sleeve. The outer wall of the sleeve 38 is threaded 58 to receive a shoulder nut 59. Tightening the shoulder nut 59 on the sleeve 38 forces a washer 60 against the packing ring 56 and causes compression of the packing material between the sleeve surface 61 and the stem 34 of the shaft 35 to produce a gas-tight seal.

A principal advantage of the gas-tight housing valve structure described is that uncontrolled leakage at the contact plane between the valve body 11 and the shiftable block 12 is obviated. When leakage occurs at this plane, due to the pressure in the valve passages which acts to unseat the shiftable block, the leaking fluid or gas is trapped in the sealed chamber 43 to develop a counter pressure in opposition to the pressure in the valve passages. The counter pressure reseats the block and prevents further leakage.

The construction materials for the valve are selected for corrosion resistance and good machining and finishing characteristics. The materials for the facing surface of the valve body and the shiftable block should preferably be such as to obviate the need for lubrication.

The sample chamber for isolation of a predetermined volume of sample gas may take any convenient form. Preferably, the sample chamber is a hollow loop or coil. The ends connect to the fixed body portion of the valve to complete the path through the valve in series with either the sample gas source or the carrier gas supply, depending upon the position of the shiftable block. The length and bore of the tubing used will define the volume of the sample chamber. This volume may be made any convenient value.

The foregoing description and the drawings are given merely to explain and illustrate my invention, and the manner in which it may be performed, and the invention is not to be limited thereto, except insofar as the appended claim is so limited since those skilled in the art who have my disclosure before them will be able to make modifications and variations therein without departing from the scope and spirit of the invention.

I claim:

A metering valve and fluid sampling device comprising a shiftable block, a fixed body member, said fixed member having an internal guideway for said block and including a gas-tight housing containing said block, and means holding the block in slidable sealing engagement with the fixed body member to define a contact plane therebetween, the fixed member and shiftable block having cooperating fluid ports and flow channels and said valve including means for selectively positioning the shiftable block with respect to the fixed member for controlling and directing the flow path of a fluid stream, said positioning means comprising a rotatable shaft projecting through said housing and having an eccentric pin at a portion thereof located within said housing, a channel in said shiftable block for receiving said pin such that upon rotation of said shaft, said pin engages said block to displace said shiftable block in a plane perpendicular to the axis of rotation of said shaft and along the guideway of the fixed member to position the cooperating fluid ports and flow channels for selection of a desired flow path, said gas-tight housing having gas-tight sealing engagement with the fixed member and with the rotatable shaft to provide a pressure equalization chamber for trapping fluid leakage at the contact plane of the fixed member and the block to develop counter-pressure on exposed surfaces of said shiftable block for neutralizing fluid pressure effects on said block.

References Cited in the file of this patent

UNITED STATES PATENTS

| | | |
|---|---|---|
| 2,564,529 | Griswold | Aug. 14, 1951 |
| 2,578,160 | Van Der Werf | Dec. 11, 1951 |
| 2,634,751 | Borer | Apr. 14, 1953 |
| 2,846,121 | Ronnebeck | Aug. 5, 1958 |